United States Patent
Chen

(10) Patent No.: US 11,249,263 B2
(45) Date of Patent: Feb. 15, 2022

(54) UNLOCKING STRUCTURE OF PLUGGABLE OPTICAL MODULE

(71) Applicant: NANTONG NLINK TECHNOLOGY CO., LTD., Jiangsu (CN)

(72) Inventor: Huaijiu Chen, Nantong (CN)

(73) Assignee: NANTONG NLINK TECHNOLOGY CO., LTD., Jiangsu (CN)

( * ) Notice: Subject to any disclaimer, the term of this patent is extended or adjusted under 35 U.S.C. 154(b) by 111 days.

(21) Appl. No.: 16/645,253

(22) PCT Filed: Jan. 13, 2020

(86) PCT No.: PCT/CN2020/071768
§ 371 (c)(1),
(2) Date: Mar. 6, 2020

(87) PCT Pub. No.: WO2021/120356
PCT Pub. Date: Jun. 24, 2021

(65) Prior Publication Data
US 2021/0405312 A1   Dec. 30, 2021

(30) Foreign Application Priority Data
Dec. 16, 2019   (CN) .......................... 201911300306.8

(51) Int. Cl.
*G02B 6/42*   (2006.01)

(52) U.S. Cl.
CPC ......... *G02B 6/4261* (2013.01); *G02B 6/4234* (2013.01)

(58) Field of Classification Search
CPC ............................ G02B 6/4234; G02B 6/4261
See application file for complete search history.

(56) References Cited

U.S. PATENT DOCUMENTS

| 6,371,787 B1 * | 4/2002 | Branch .............. H01R 13/6275 439/352 |
| 8,724,955 B2 * | 5/2014 | LaVoie .............. H01R 13/6335 385/134 |

(Continued)

FOREIGN PATENT DOCUMENTS

| CN | 204178013 U | 2/2015 |
| CN | 108037568 A | 5/2018 |

(Continued)

OTHER PUBLICATIONS

Sep. 18, 2020 International Search Report issued in International Patent Application No. PCT/CN2020/071768.

*Primary Examiner* — Daniel Petkovsek
(74) *Attorney, Agent, or Firm* — Oliff PLC

(57) ABSTRACT

A pluggable optical module unlocking structure has a shell and outer buckle; a mounting groove with a metal rocker plate having a flat and oblique rocker plates; the oblique rocker plate at a flat rocker plate end away from the outer buckle, and an oblique rocker plate end near the flat rocker plate is a lower end; a flat rocker plate end away from the oblique rocker plate symmetrically has lifting claws on both sides of the outer buckle; a pulling tab is slidably mounted on the shell, the pulling tab includes a pressing rod in a shell width direction, and a lower end pressing rod surface abuts against a flat rocker plate upper end surface. The pressing rod and metal rocker plate form a seesaw structure unlocking mechanism. The pulling tab moves the pressing rod so that the lifting claws raise the cage spring upward to unlock.

9 Claims, 5 Drawing Sheets

(56) References Cited

U.S. PATENT DOCUMENTS

| | | | |
|---|---|---|---|
| 9,671,582 B2* | 6/2017 | Yeh | H04B 10/40 |
| 10,042,130 B1* | 8/2018 | Wang | G02B 6/4261 |
| 10,451,819 B2* | 10/2019 | Yizhi | G02B 6/4261 |
| 10,795,101 B2* | 10/2020 | Dong | H01R 13/6275 |
| 2002/0142649 A1* | 10/2002 | Baugh | H01R 13/633 |
| | | | 439/532 |

FOREIGN PATENT DOCUMENTS

| | | | | |
|---|---|---|---|---|
| CN | 108873188 A | | 11/2018 | |
| CN | 110261972 A | | 9/2019 | |
| CN | 209560149 U | | 10/2019 | |
| CN | 210894790 U | | 6/2020 | |
| CN | 111736279 A | * | 10/2020 | G02B 6/42 |
| JP | 2010-145484 A | | 7/2010 | |

* cited by examiner

UNLOCKING STRUCTURE OF PLUGGABLE OPTICAL MODULE

TECHNICAL FIELD

The present disclosure relates to the technical field of optical communication, and more particularly, to an unlocking structure of a pluggable optical module.

BACKGROUND

Pluggable optical modules generally require an ejection unlocking structure. When inserted into a cage and in use, the optical module can be locked in position so that it is prevented from being released and coming out, and interruption of signal transmission is avoided. Moreover, the optical module can also be easily pulled out of the cage when it needs to be removed.

In the related art, the optical module and the cage are mainly connected by a buckle structure. That is, an outer buckle is disposed on the optical module, and an inner buckle that cooperates with the outer buckle is disposed on a cage spring in the corresponding cage. With the cooperation of the inner buckle and the outer buckle, the optical module is limited inside the cage. When the optical module needs to be pulled out, a release unlocking structure is required to separate the inner buckle from the outer buckle, so that the pluggable optical module can be easily pulled out.

In the traditional ejection unlocking structure, the purpose of ejection is achieved by an ejection boss integrally formed by a plastic piece. The ejection boss has an arc-shaped structure. When a pulling tab is pulled, the cage spring is lifted by the arc-shaped feature of the ejection boss, thereby releasing the snap-fit action of the inner buckle and the outer buckle. Since both the pulling tab and the ejection boss are made of plastic material, a relative action occurs between the ejection boss and the cage spring when unlocking the ejection, and abrasion will be caused after long time use, which may easily lead to ejection failure.

SUMMARY

An object of the present disclosure is to provide an unlocking structure of a pluggable optical module, which has a simple structure, facilitates assembly and replacement of components, has a good effect of ejection unlocking, does not scrap the entire assembly due to damage of local components, and has a long service life.

The above technical object of the present disclosure is achieved by the following technical solution:

an unlocking structure of a pluggable optical module, including an optical module, the optical module includes a shell, and an outer buckle being disposed on an upper end surface of the shell; wherein a mounting groove is disposed in the upper end surface of the shell, the mounting groove is provided therein with a metal rocker plate disposed in a length direction of the shell, and the metal rocker plate includes a flat rocker plate horizontally disposed and an oblique rocker plate obliquely disposed; the oblique rocker plate is disposed at an end of the flat rocker plate away from the outer buckle, and an end of the oblique rocker plate near the flat rocker plate is a lower end; an end of the flat rocker plate away from the oblique rocker plate is symmetrically provided with lifting claws on both sides of the outer buckle; a pulling tab is slidably mounted on the shell and is capable of sliding in the length direction of the shell, the pulling tab is provided with a pressing rod disposed in a width direction of the shell, and a lower end surface of the pressing rod abuts against an upper end surface of the flat rocker plate.

By adopting the above technical solution, when the optical module is inserted into a cage, the optical module is limited inside the cage under the snap-fit action of the outer buckle and an inner buckle on a cage spring in the cage to ensure the stability of signal transmission. When the optical module needs to be pulled out of the cage, the pulling tab is pulled in a direction away from the outer buckle, and the pulling tab drives the pressing rod to move from the flat rocker plate to the oblique rocker plate. The pressing rod flattens the oblique rocker plate, and the flat rocker plate drives the lifting claws to tilt and raise. The lifting claws raise the cage spring in the cage, thereby releasing the snap-fit action of the inner buckle and the outer buckle so that the optical module can be pulled out of the cage. The above structure is simple and convenient to assemble. The pressing rod and the metal rocker plate are used to form an ejection unlocking mechanism of a seesaw structure. The pressing rod is moved by the pulling tab so that the lifting claws raise the cage spring upward to achieve the purpose of unlocking. There is no friction of relative movement between the lifting claws and the cage spring; moreover, the metal rocker plate is made of metallic material, so it has a long service life and a good ejection effect. The separate design of the pulling tab and the metal rocker plate prevents the entire assembly from being scrapped due to damage of local components, which effectively saves costs.

Further, the pulling tab is symmetrically provided with outwardly extending projections on two sides of the pulling tab when viewed in a length direction of the pulling tab, and an upper end surface of the shell is provided with guide grooves matching the projections; tension springs are disposed in the guide grooves, and two ends of the tension springs abut against the projections and side walls of the guide grooves that are away from the outer buckle, respectively.

By adopting the above technical solution, the projections are slidably mounted in the guide grooves so that the pulling tab is slidably mounted on the shell, and a sliding stability of the pulling tab is ensured. Under the tension of the tension spring, the pulling tab in a normal state drives the pressing rod to press on the flat rocker plate, which not only can ensure the stability of the snap-fit of the outer buckle and the inner buckle on the cage spring and ensure that the optical module is stably inserted into the cage, but also facilitates resetting the metal rocker plate after the optical module is pulled out of the cage. The structure thereof is simple and the effect is obvious.

Further, the flat rocker plate is provided with a reset bump parallel to the pressing rod, the reset bump is located at an intersection of the flat rocker plate and the oblique rocker plate, and the pressing rod is located on a side of the reset bump that is away from the outer buckle.

By adopting the above technical solution, when the pulling tab drives the pressing rod to be reset under the tension of the tension springs, the pressing rod abuts against the reset bump and causes a push, thereby resetting the metal rocker plate and lowering the lifting claws to be reset. The provision of the reset bump can further ensure the resetting effect of the metal rocker plate, the structure thereof is simple, and the effect is obvious.

Further, the metal rocker plate is symmetrically provided with limiting posts on two sides of the metal rocker plate when viewed in a length direction of the metal rocker plate, the limiting posts are located at the intersection of the flat rocker plate and the oblique rocker plate, and the shell is provided with limiting grooves matching the limiting posts and communicating with the mounting groove.

By adopting the above technical solution, the limiting posts are mounted in the limiting grooves so that the metal rocker plate is limited in position, which prevents the metal rocker plate from moving when the pressing rod drives the metal rocker plate to rotate, and avoids affecting the unlocking effect. The limiting posts are disposed at the intersection of the flat rocker plate and the oblique rocker plate, and will not affect the rotation of the metal rocker plate. The structure thereof is simple and the effect is obvious.

Further, the shell is provided with a receiving opening that matches the pulling tab, the pulling tab is slidably mounted in the receiving opening, and an upper end surface of the pulling tab is lower than an upper end surface of the shell.

By adopting the above technical solution, the pulling tab is slidably mounted in the receiving opening to prevent the pulling tab from protruding on the upper end surface of the shell, so that the volume of the unlocking structure can be reduced; the structure is simplified and the effect is obvious.

Further, a stop block which is vertically disposed is provided in the receiving opening, and a stop opening matching the stop block is provided in the pulling tab.

By adopting the above technical solution, a moving stroke of the pulling tab can be restricted under the cooperation of the stop block and the stop opening. If the pulling tab cannot be pulled under the restriction of the stop block, it indicates that the unlocking has been achieved and the optical module can be removed with no need to pull the pulling tab hard while overcoming the action of the tension springs all the time. The structure thereof is simple, and the best ejection effect can be achieved.

Further, a pressing plate is detachably mounted on the shell above the pulling tab, and the pressing plate covers the guide grooves and the pressing rod.

By adopting the above technical solution, under the pressing action of the pressing plate, the pulling tab is prevented from being detached upward from the shell, the pulling tab is restricted and can only move in the length direction of the shell, and the stability and use effect of the pulling tab during operation are guaranteed. The pressing plate covers the guide grooves and the pressing rod, which can ensure the aesthetic appearance, also prevent foreign matters from entering the mounting groove to affect the rotation of the metal rocker plate, and ensure the use effect of the unlocking structure. In addition, the pressing plate is detachably mounted on the shell, which facilitates checking and replacing the pulling tab, the pressing rod or the metal rocker plate. The structure thereof is simple, the operation is convenient and the effect is obvious.

Further, an inclination angle of the oblique rocker plate is 12°-15°.

By adopting the above technical solution, the inclination angle of the oblique rocker plate is 12°-15°. At the same time of ensuring that the lifting claws can lift the cage spring to unlock when the metal rocker plate is rotated, it also avoids inconvenient mounting of the metal rocker plate caused by the mounting groove being disposed very deep since the angle of the oblique rocker plate is too large, and also avoids easily damaging the cage spring since the lifting claws are raised too high.

Further, upper end surfaces of the lifting claws are obliquely disposed, and ends of the lifting claws near the flat rocker plate are higher ends.

By adopting the above technical solution, the lifting claws are obliquely disposed, so that during the process of raising the lifting claws by the rotation of the metal rocker plate, the contact between the lifting claws and the cage spring is buffered to a certain extent to avoid damaging the cage spring when the lifting claws raise the cage spring, which not only ensures the unlocking effect, but also guarantees the service life of the cage spring. The structure thereof is simple and the effect is obvious.

In summary, the present disclosure has the following advantageous effects.

1. With the arrangement of the metal rocker plate, the pulling tab, and the pressing rod, the pressing rod and the metal rocker plate are used to form an ejection unlocking mechanism of a seesaw structure. The pressing rod is moved by the pulling tab so that the lifting claws raise the cage spring upward to achieve the purpose of unlocking. There is no friction of relative movement between the lifting claws and the cage spring; moreover, the metal rocker plate is made of metallic material, so it has a long service life and a good ejection effect.

2. With the arrangement of the reset bump, the resetting effect of the metal rocker plate is further ensured. When the pulling tab drives the pressing rod to be reset, the pressing rod abuts against the reset bump and causes a push, thereby resetting the metal rocker plate and lowering the lifting claws to be reset.

Figure 1:
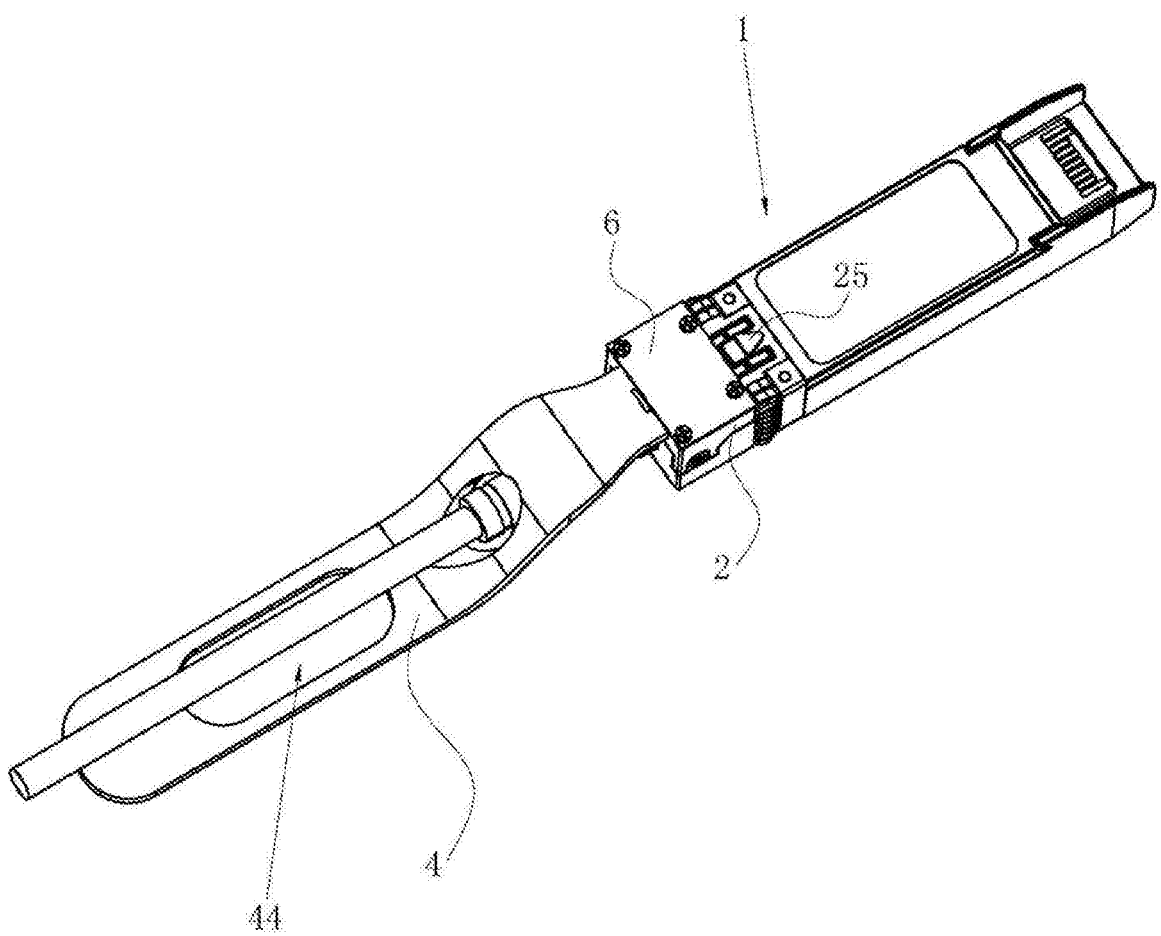
FIG. 1 is an overall schematic structural view of an unlocking structure of a pluggable optical module.

In the drawings: 1: optical module; 2: shell; 21: mounting groove; 22: guide groove; 23: limiting groove; 24: receiving opening; 25: outer buckle; 26: stop block; 3: metal rocker plate; 31: flat rocker plate; 32: oblique rocker plate; 33: reset bump; 34: lifting claw; 35: limiting post; 4: pulling tab; 41: projection; 42: tension spring; 43: stop opening; 44: finger hole; 45: mounting opening; 5: pressing rod; 6: pressing plate.

DETAILED DESCRIPTION

The present disclosure will be further described in detail below with reference to the drawings and embodiments. It should be understood that the specific embodiments described herein are only used to explain the present disclosure and are not intended to limit the present disclosure.

As shown in FIG. 1, an unlocking structure of a pluggable optical module includes an optical module 1, the optical module 1 includes a shell 2, and an outer buckle 25 is disposed on an upper end surface of the shell 2 for cooperation with an inner buckle on a cage spring in a cage. Under the snap-fit action of the inner buckle and the outer buckle 25, the optical module 1 is limited inside the cage to ensure the stability and smoothness of signal transmission.

Figure 2:
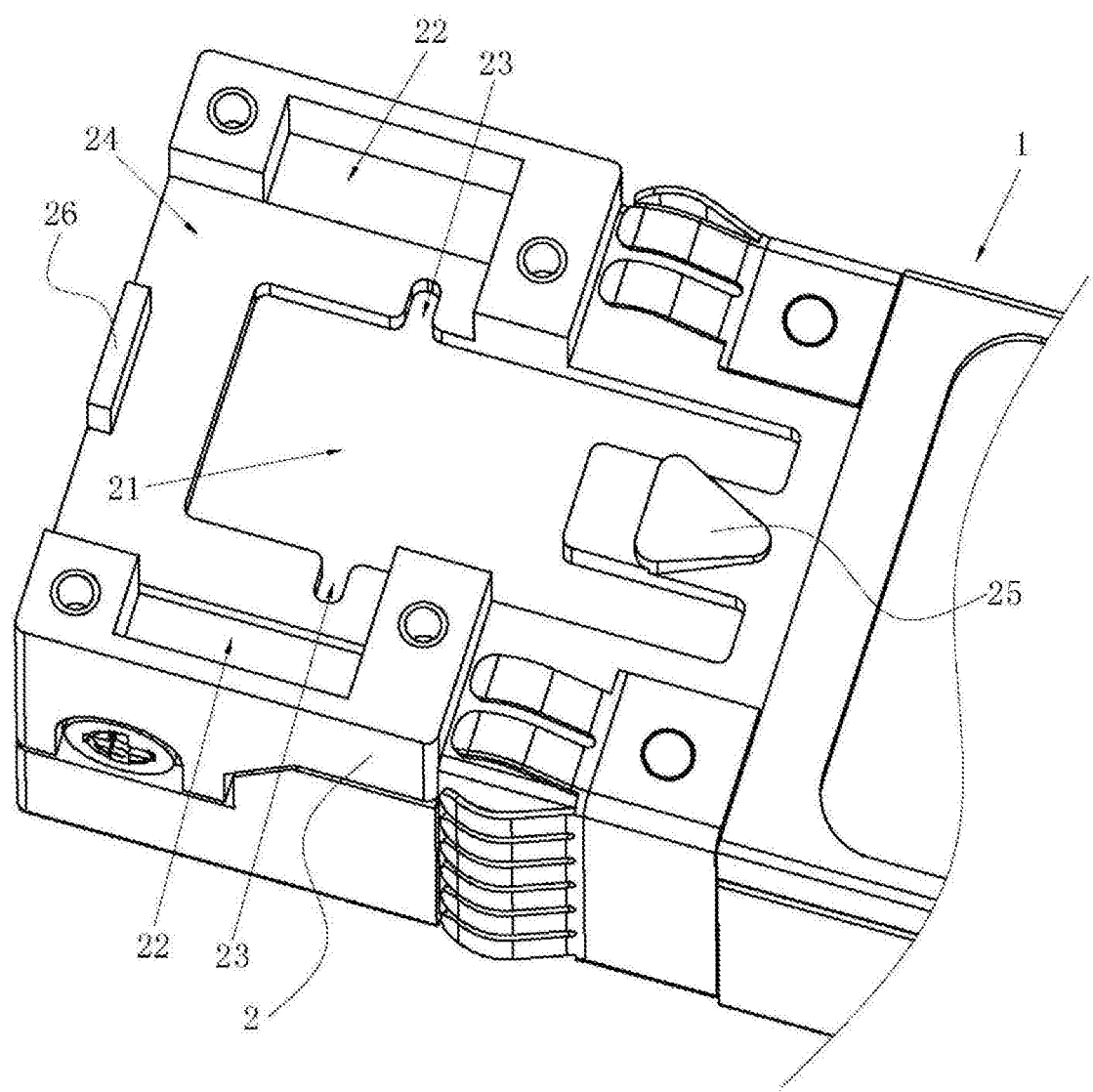
FIG. 2 is a schematic structural view of a mounting groove in the unlocking structure of the pluggable optical module.
Figure 3:
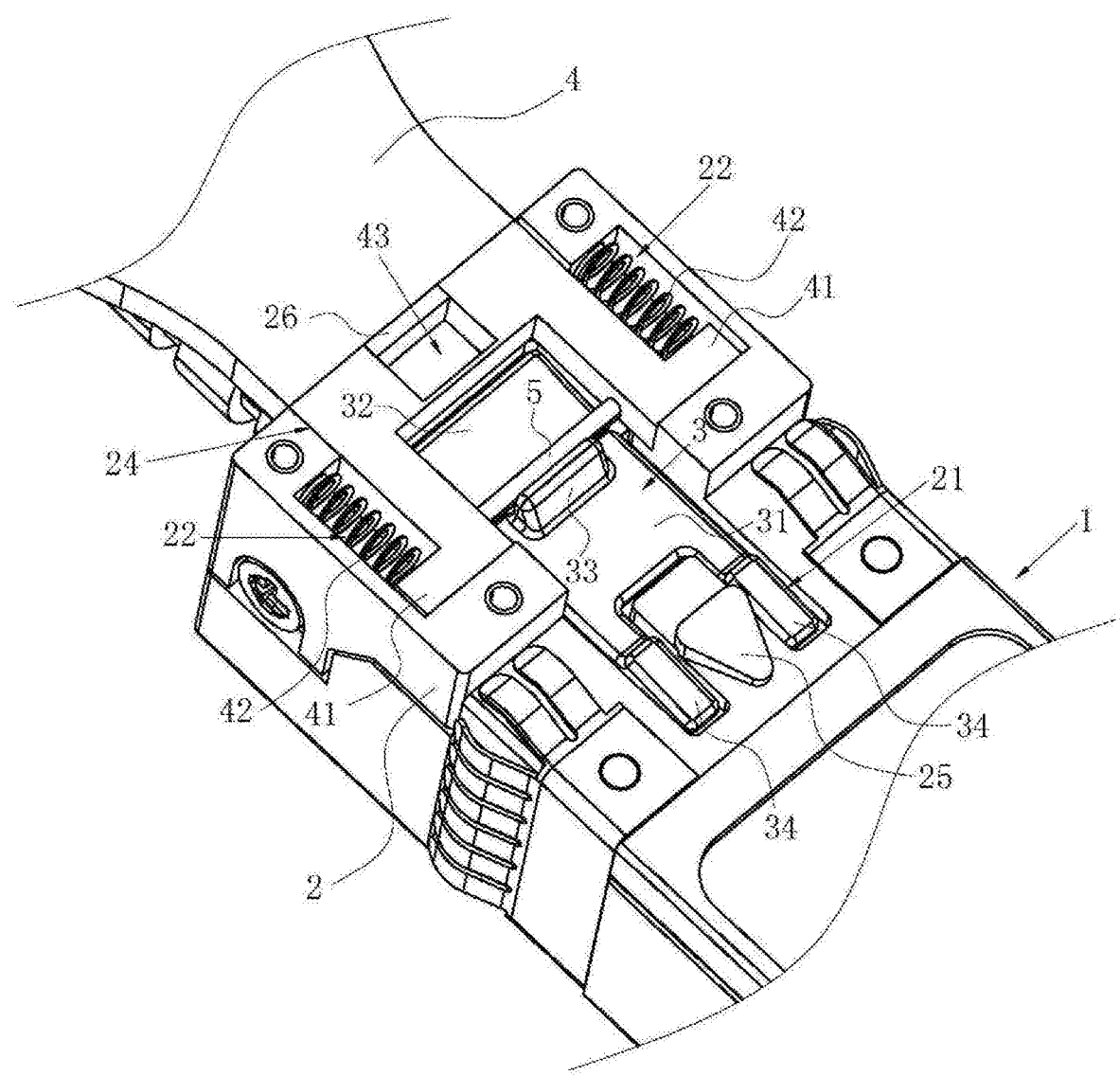
FIG. 3 is a partial schematic structural view of the unlocking structure of the pluggable optical module.
Figure 4:
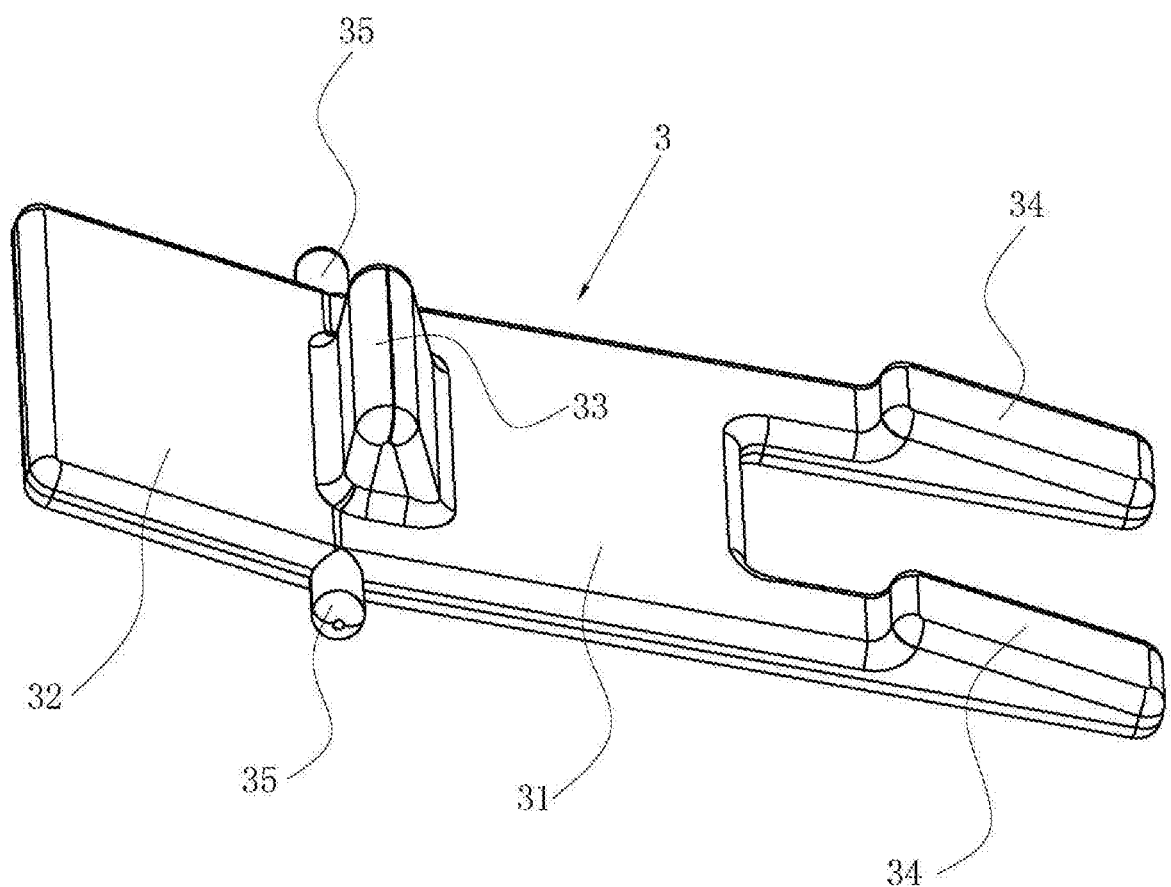
FIG. 4 is a schematic structural view of a metal rocker plate in the unlocking structure of the pluggable optical module.

As shown in FIG. 2, a mounting groove 21 is disposed on the upper end surface of the shell 2. The mounting groove 21 has a U-shaped structure, and the outer buckle 25 is disposed in an opening of the mounting groove 21 and above the mounting groove 21. As shown in FIG. 3 and FIG. 4, a metal rocker plate 3 is disposed in the mounting groove 21 in a length direction of the shell 2. The metal rocker plate 3 includes a flat rocker plate 31 horizontally disposed and an oblique rocker plate 32 obliquely disposed; the oblique rocker plate 32 is disposed at an end of the flat rocker plate 31 away from the outer buckle 25, and an end of the oblique rocker plate 32 near the flat rocker plate 31 is a lower end. As shown in FIG. 4, the metal rocker plate 3 is provided with limiting posts 35 on two sides of the metal rocker plate 3 when viewed in a length direction of the metal rocker plate 3 respectively, the limiting posts 35 are disposed in a width direction of the shell 2, and the limiting posts 35 are located at an intersection of the flat rocker plate 31 and the oblique rocker plate 32. As shown in FIG. 2 and FIG. 3, the shell 2 is provided with limiting grooves 23 that match the limiting posts 35 and communicate with the mounting groove 21. The limiting posts 35 are rotatably mounted in the limiting grooves 23 so that the metal rocker plate 3 is rotatably mounted in the mounting groove 21. As shown in FIG. 3 and FIG. 4, an end of the flat rocker plate 31 away from the oblique rocker plate 32 is symmetrically provided with lifting claws 34 on both sides of the outer buckle 25, upper end surfaces of the lifting claws 34 are obliquely disposed, and ends thereof near the flat rocker plate 31 are higher ends. The inclination angles of the oblique rocker plate 32 and the upper end surfaces of the lifting claws 34 are each 12°-15°. In this embodiment, the inclination angles of the oblique rocker plate 32 and the upper end surfaces of the lifting claws 34 are each 12°.

Figure 5:
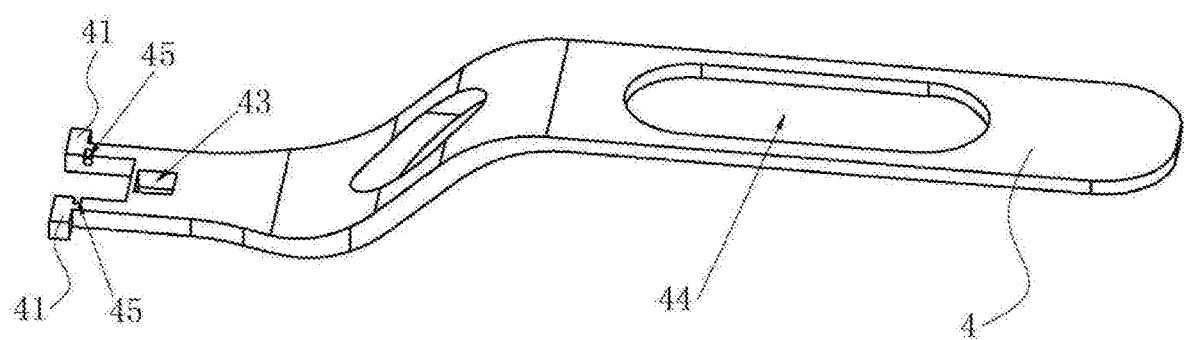
FIG. 5 is a schematic structural view of a pulling tab in the unlocking structure of the pluggable optical module.

As shown in FIG. 2 and FIG. 3, an upper end surface of the shell 2 at an end away from the outer buckle 25 is provided with a receiving opening 24, and a lower end surface of the receiving opening 24 is flush with an upper end surface of the mounting groove 21; a pulling tab 4 capable of sliding in the length direction of the shell 2 is slidably mounted in the receiving opening 24, and an end of the pulling tab 4 protrudes outside the shell 2 from the receiving opening 24. As shown in FIG. 3 and FIG. 5, the pulling tab 4 is provided with a notch that cooperates with the mounting groove 21. A pressing rod 5 disposed in the width direction of the shell 2 is provided in the notch of the pulling tab 4, and a lower end surface of the pressing rod 5 abuts against the upper end surface of the flat rocker plate 31. As shown in FIG. 5, the pulling tab 4 is provided with mounting openings 45 that match two ends of the pressing rod 5, and the mounting openings 45 penetrate a lower end surface of the pulling tab 4 so that the pressing rod 5 is mounted on the pulling tab 4 and replacement of the pressing rod 5 is facilitated. In this embodiment, the pulling tab 4 has a "ㄴ"-shaped structure, and a finger hole 44 is provided on a part of the pulling tab 4 remote from the shell 2 so as to facilitate in inserting a finger into the finger hole 44 to pull the pulling tab 4.

When the optical module 1 needs to be pulled out of the cage, the pulling tab 4 is pulled in a direction away from the outer buckle 25. The pulling tab 4 drives the pressing rod 5 to move from the flat rocker plate 31 to the oblique rocker plate 32, the pressing rod 5 flattens the oblique rocker plate 32, the flat rocker plate 31 drives the lifting claws 34 to raise obliquely, and the lifting claws 34 raises the cage spring in the cage, thereby releasing the snap-fit action between the inner buckle and the outer buckle 25, so that the optical module 1 can be pulled out of the cage. In this way, the pressing rod 5 and the metal rocker plate 3 are used to form a seesaw structure. The pressing rod 5 is moved by the pulling tab 4 so that the lifting claws 34 raise the cage spring upward to achieve the purpose of unlocking. There is no friction of relative movement between the lifting claws 34 and the cage spring; moreover, the metal rocker plate 3 is made of metallic material, so it has a long service life and a good ejection effect. The separate design of the pulling tab 4 and the metal rocker plate 3 prevents the entire assembly from being scrapped due to damage of local components, which effectively saves costs.

As shown in FIG. 3, in order to slidably mount the pulling tab 4 on the shell 2, outwardly extending projections 41 are symmetrically disposed on two sides of the pulling tab 4 when viewed in the length direction of the pulling tab 4, the upper end surface of the shell 2 is provided with guide grooves 22 matching the projections 41, and the guide grooves 22 are located above the mounting groove 21. Tension springs 42 are further provided in the guide grooves 22, and both ends of the tension springs 42 abut against the projections 41 and side walls of the guide grooves 22 away from the outer buckle 25, respectively. In this way, under the tension of the tension springs 42, the pulling tab 4 in a normal state drives the pressing rod 5 to press on the flat rocker plate 31, which not only can ensure the stability of the snap-fit of the outer buckle 25 and the inner buckle on the cage spring, but also facilitates resetting the metal rocker plate 3 after the optical module 1 is pulled out of the cage.

In order to further ensure the resetting effect of the metal rocker plate 3, as shown in FIG. 3 and FIG. 4, the flat rocker plate 31 is provided with a reset bump 33 parallel to the pressing rod 5, the reset bump 33 is located at the intersection of the flat rocker plate 31 and the oblique rocker plate 32, and the pressing rod 5 is located on a side of the reset bump 33 that is away from the outer buckle 25. When the pulling tab 4 drives the pressing rod 5 to be reset under the tension of the tension springs 42, the pressing rod 5 abuts against the reset bump 33 and causes a push, thereby resetting the metal rocker plate 3 and lowering the lifting claws 34 to be reset. As shown in FIG. 3, the shell 2 is further provided with a stop block 26 which is vertically disposed in the receiving opening 24, and a stop opening 43 matching the stop block 26 is provided in the pulling tab 4. In this way, a moving stroke of the pulling tab 4 can be restricted, and the best ejection effect can be achieved. If the pulling tab 4 cannot be pulled under the restriction of the stop block 26, it indicates that the unlocking has been achieved and the optical module 1 can be removed with no need to pull the pulling tab 4 hard while overcoming the action of the tension springs all the time.

In addition, as shown in FIG. 1 and FIG. 3, a pressing plate 6 covering the pulling tab 4 is detachably mounted on the shell 2 by screws, and the pressing plate 6 covers the guide grooves 22 and the pressing rod 5. Under the pressing action of the pressing plate 6, the pulling tab 4 is restricted and can only move in the length direction of the shell 2, the pulling tab 4 is prevented from being pulled upward out of the shell 2, and the stability and use effect of the pulling tab 4 during operation are guaranteed. The pressing plate 6 covers the guide grooves 22 and the pressing rod 5, which can ensure the aesthetic appearance, also prevent foreign matters from entering the mounting groove 21 to affect the rotation of the metal rocker plate 3, and ensure the use effect of the unlocking structure. In addition, the pressing plate 6 is mounted on the shell 2 by screws, which facilitates checking and replacing the pulling tab 4, the pressing rod 5 or the metal rocker plate 3.

The working principle and using method of the present disclosure are explained below.

In a normal state, the optical module 1 is limited inside the cage under the snap-fit action of the inner buckle and the outer buckle 25 to ensure the stability and smoothness of signal transmission. When the optical module 1 needs to be pulled out of the cage, the pulling tab 4 is pulled in a direction away from the outer buckle 25, and the pulling tab 4 drives the pressing rod 5 to move from the flat rocker plate 31 to the oblique rocker plate 32 so that the metal rocker plate 3 rotates. The pressing rod 5 flattens the oblique rocker plate 32, and the flat rocker plate 31 drives the lifting claws 34 to tilt and raise. The lifting claws 34 raise the cage spring in the cage, thereby releasing the snap-fit action of the inner buckle and the outer buckle 25 so that the optical module 1 can be pulled out of the cage. When the pulling tab 4 cannot be pulled under the restriction of the stop block 26, it indicates that the unlocking has been achieved and the optical module 1 can be removed. After the pulling tab 4 is released, under the tension of the tension springs 42, the pulling tab 4 is driven to reset the pressing rod 5, and the pressing rod 5 abuts against the reset bump 33 to cause a push and reset the metal rocker plate 3.

Preferred embodiments of the present disclosure have been illustrated and described above. As mentioned above, it should be understood that the present disclosure is not limited to the forms disclosed herein, and should not be regarded as excluding other embodiments; rather, it can be used in various other combinations, modifications, and environments, and can be altered within the scope of the concepts of the present disclosure described herein through the teachings above or through technology or knowledge in the relevant art. The modifications and changes made by those skilled in the art without departing from the spirit and scope of the present disclosure shall all fall within the scope of protection of the appended claims of the present disclosure.

The invention claimed is:

1. An unlocking structure of a pluggable optical module, comprising an optical module, the optical module comprises a shell, and an outer buckle being disposed on an upper end surface of the shell; wherein a mounting groove is disposed in the upper end surface of the shell, the mounting groove is provided therein with a metal rocker plate disposed in a length direction of the shell, and the metal rocker plate comprises a flat rocker plate horizontally disposed and an oblique rocker plate obliquely disposed; the oblique rocker plate is disposed at an end of the flat rocker plate away from the outer buckle, and an end of the oblique rocker plate near the flat rocker plate is a lower end; an end of the flat rocker plate away from the oblique rocker plate is symmetrically provided with lifting claws on both sides of the outer buckle; a pulling tab is slidably mounted on the shell and is capable of sliding in the length direction of the shell, the pulling tab is provided with a pressing rod disposed in a width direction of the shell, and a lower end surface of the pressing rod abuts against an upper end surface of the flat rocker plate.

2. The unlocking structure of a pluggable optical module according to claim 1, wherein the pulling tab is symmetrically provided with outwardly extending projections on two sides of the pulling tab when viewed in a length direction of the pulling tab and an upper end surface of the shell is provided with guide grooves matching the projections; tension springs are disposed in the guide grooves, and two ends of the tension springs abut against the projections and side walls of the guide grooves that are away from the outer buckle, respectively.

3. The unlocking structure of a pluggable optical module according to claim 2, wherein the flat rocker plate is provided with a reset bump parallel to the pressing rod, the reset bump is located at an intersection of the flat rocker plate and the oblique rocker plate, and the pressing rod is located on a side of the reset bump that is away from the outer buckle.

4. The unlocking structure of a pluggable optical module according to claim 3, wherein the metal rocker plate is symmetrically provided with limiting posts on two sides of the metal rocker plate when viewed in a length direction of the metal rocker plate, the limiting posts are located at the intersection of the flat rocker plate and the oblique rocker plate, and the shell is provided with limiting grooves matching the limiting posts and communicating with the mounting groove.

5. The unlocking structure of a pluggable optical module according to claim 2, wherein a pressing plate is detachably mounted on the shell shell above the pulling tab, and the pressing plate covers the guide grooves and the pressing rod.

6. The unlocking structure of a pluggable optical module according to claim 1, wherein the shell is provided with a receiving opening that matches the pulling tab, the pulling tab is slidably mounted in the receiving opening, and an upper end surface of the pulling tab is lower than an upper end surface of the shell.

7. The unlocking structure of a pluggable optical module according to claim 6, wherein a stop block which is vertically disposed is provided in the receiving opening, and a stop opening matching the stop block is provided in the pulling tab.

8. The unlocking structure of a pluggable optical module according to claim 1, wherein an inclination angle of the oblique rocker plate is 12°-15°.

9. The unlocking structure of a pluggable optical module according to claim 1, wherein upper end surfaces of the lifting claws are obliquely disposed, and ends of the lifting claws near the flat rocker plate are higher ends.

\* \* \* \* \*